US00RE49984E

(19) United States
(12) Reissued Patent
Samikkannu et al.

(10) Patent Number: US RE49,984 E
(45) Date of Reissued Patent: May 28, 2024

(54) TABLE

(71) Applicant: AMTAB MANUFACTURING CORPORATION, Bensenville, IL (US)

(72) Inventors: Doss Samikkannu, Des Plaines, IL (US); Jeremias C. Rivera, Jr., Elmhurst, IL (US)

(73) Assignee: AMTAB MANUFACTURING CORPORATION, Aurora, IL (US)

(21) Appl. No.: 29/725,015

(22) Filed: Feb. 21, 2020

Related U.S. Patent Documents

Reissue of:
(64) Patent No.: Des. 836,928
Issued: Jan. 1, 2019
Appl. No.: 29/611,865
Filed: Jul. 26, 2017

(51) LOC (14) Cl. ..... 06-01
(52) U.S. Cl.
USPC ..... D6/337
(58) Field of Classification Search
USPC ..... D6/334–338, 340–342
(Continued)

(56) References Cited

U.S. PATENT DOCUMENTS 2,777,742 A * 1/1957 Schieber ..... A47B 5/06 108/169
3,191,991 A * 6/1965 Anderson ..... A47B 3/14 297/158.4

(Continued)

OTHER PUBLICATIONS

AmTab Manufacturing Corporation, AmTab American Tables—Since 1958, Mobile Table catalog, 2016, pp. 3, 6, 8 and 9.

*Primary Examiner* — Darlington Ly

(74) *Attorney, Agent, or Firm* — Barnes & Thornburg LLP

(57) CLAIM

The ornamental design for a table[with bench seating], as shown and described.

DESCRIPTION

FIG. 1 is a top front perspective view of a table [with bench seating] depicting the new design;
FIG. 2 is a front elevational view of the table depicted in FIG. 1;
FIG. 3 is a rear elevational view of the table depicted in FIG. 1;
FIG. 4 is a left side elevational view of the table depicted in a FIG. 1;
FIG. 5 is a right side elevational view of the table depicted in FIG. 1;
FIG. 6 is a top plan view of the table depicted in FIG. 1; and,
FIG. 7 is a bottom plan view of the table depicted in FIG. 1[.];
*FIG. 8 is a top and front perspective view of a table depicting another embodiment of the new design;*
*FIG. 9 is a front elevational view of the table depicted in FIG. 8;*
*FIG. 10 is a rear elevational view of the table depicted in FIG. 8;*
*FIG. 11 is a left side elevational view of the table depicted in FIG. 8*
*FIG. 12 is a right side elevational view of the table depicted in FIG. 8;*
*FIG. 13 is a top plan view of the table depicted in FIG. 8; and,*
*FIG. 14 is a bottom plan view of the table depicted in FIG. 8.*
The broken lines [showing portions of the table frame are for the purpose of illustrating] *in the drawings illustrate* portions of the table [with bench seating] that form no part of the claimed design.

1 Claim, 10 Drawing Sheets

Figure 1:
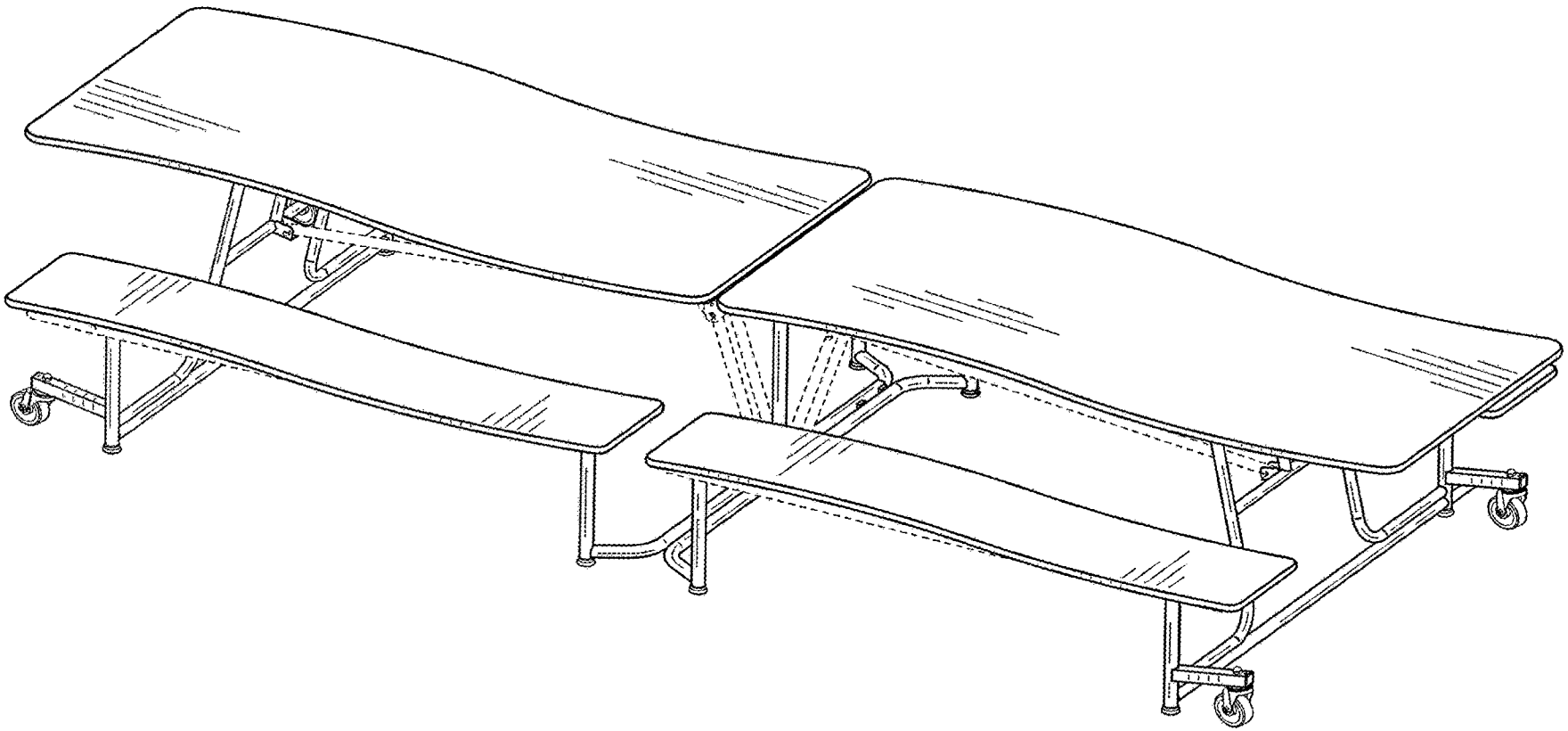
Figure 2:
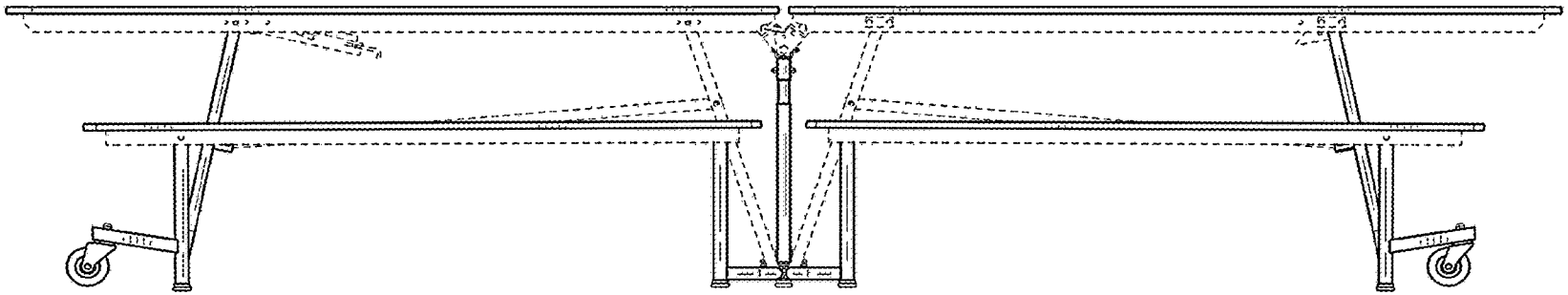
Figure 3:
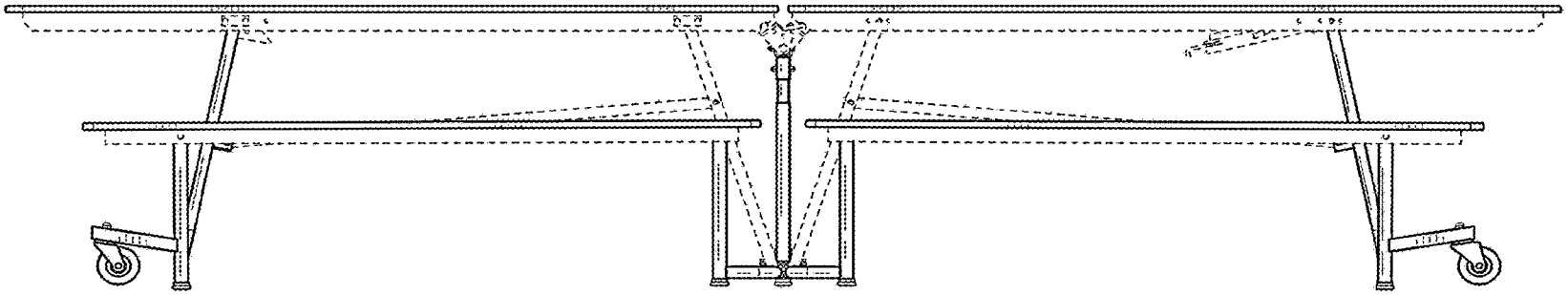
Figure 4:
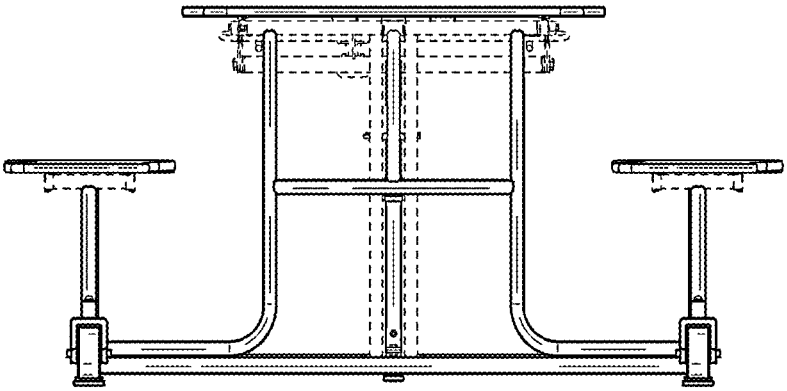
Figure 5:
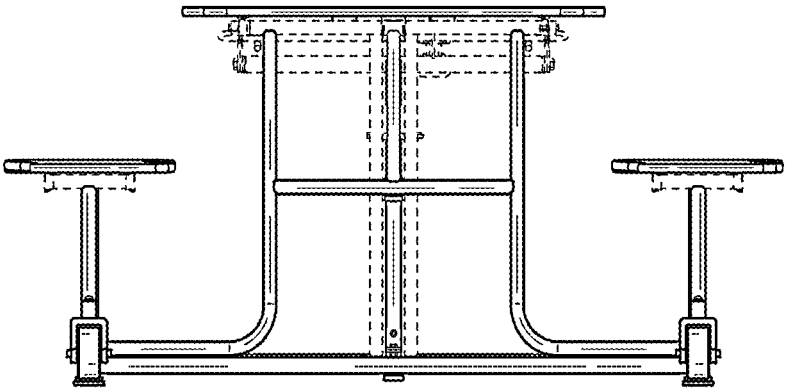
Figure 6:
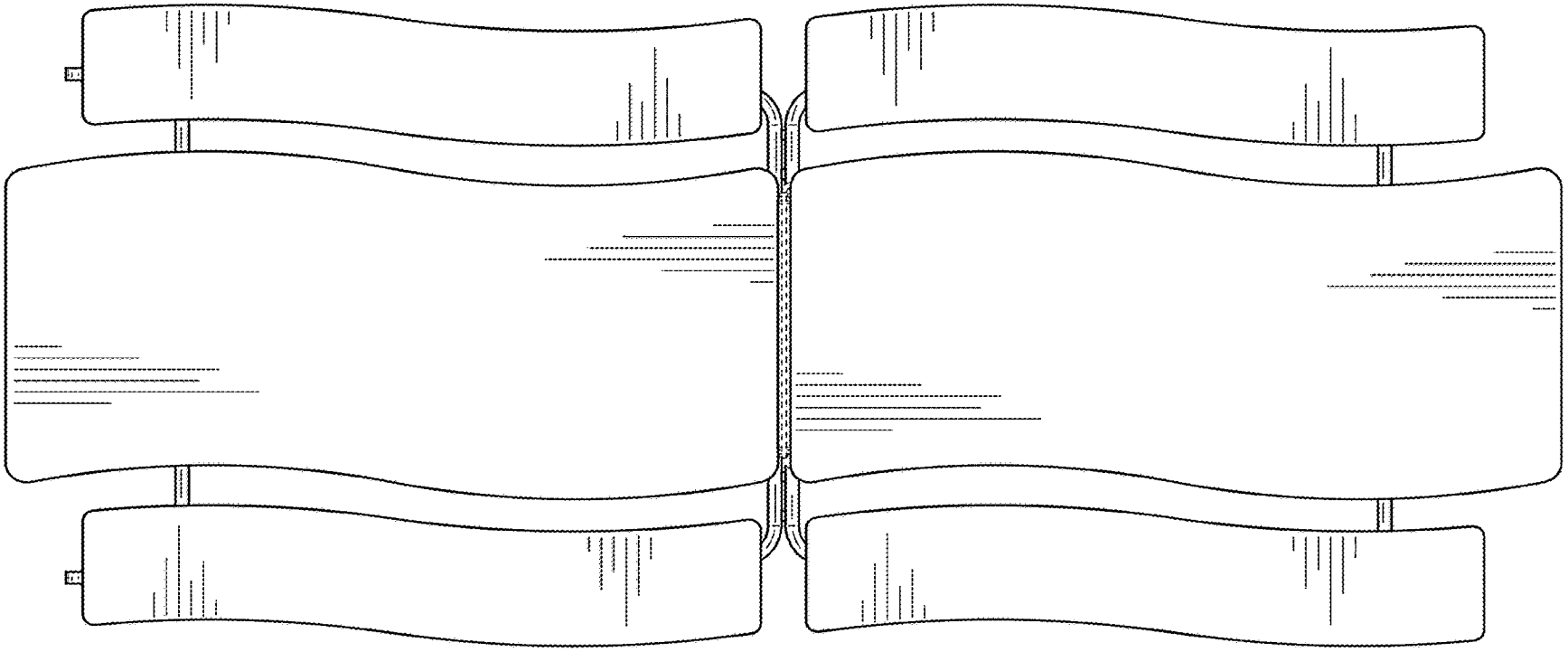
Figure 7:
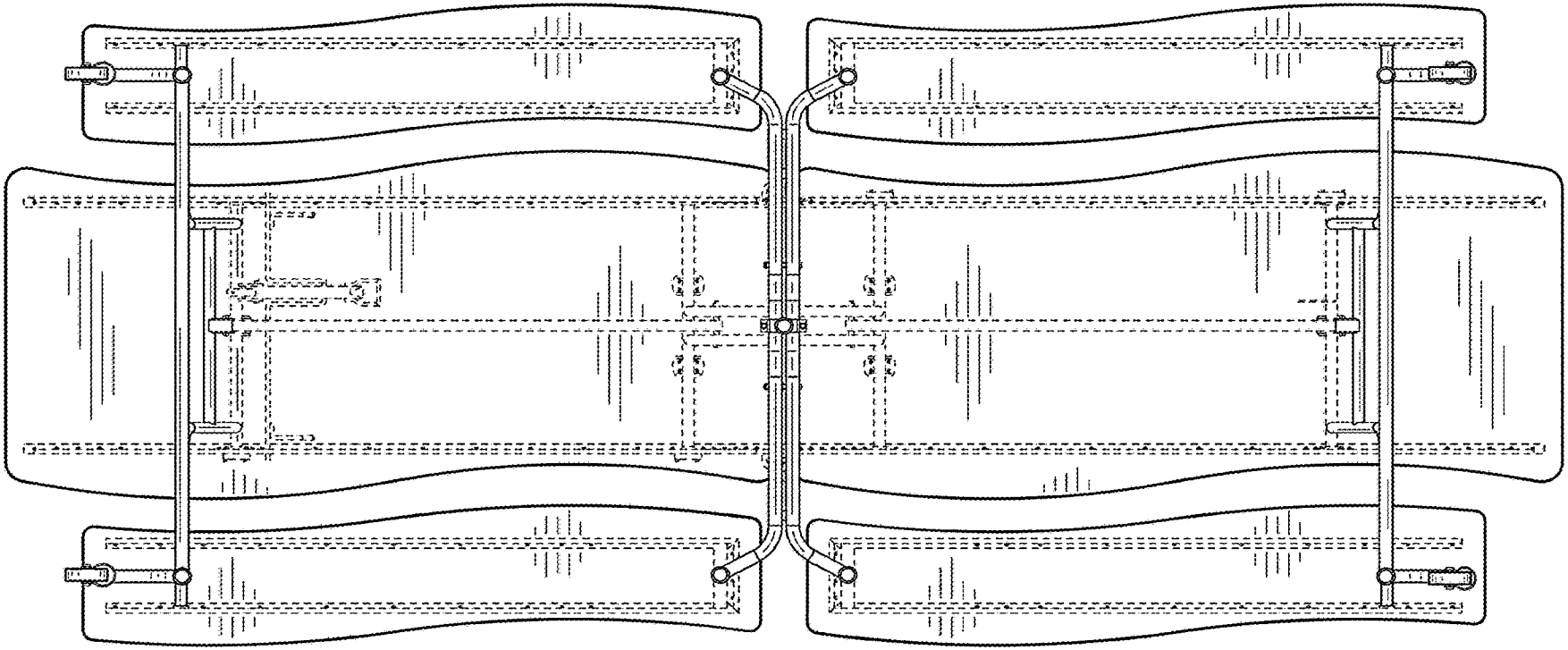

Matter enclosed in heavy brackets [ ] appears in the original patent but forms no part of this reissue; matter printed in italics indicates the additions made by reissue.

(58) Field of Classification Search
CPC ..... A47B 3/002; A47B 3/083; A47B 3/087; A47B 3/14; A47B 2003/145; A47B 83/02
See application file for complete search history.

(56) References Cited

U.S. PATENT DOCUMENTS

| | | | | |
|---|---|---|---|---|
| D209,758 | S | 1/1968 | Blink et al. | |
| D211,886 | S | 8/1968 | Benjamin | |
| 4,819,569 | A * | 4/1989 | Bastian | A47B 3/083 108/169 |
| 4,826,244 | A * | 5/1989 | Choi | A47B 3/14 108/35 |
| D327,779 | S | 7/1992 | Jensen | |
| D390,381 | S | 2/1998 | Dormon | |
| D413,734 | S | 9/1999 | Bue | |
| D417,094 | S | 11/1999 | Schwartz | |
| 6,065,802 | A | 5/2000 | Bue | |
| D439,060 | S | 3/2001 | Larsen | |
| 6,223,661 | B1 * | 5/2001 | Griepentrog | A47B 3/14 108/115 |
| 6,347,831 | B1 | 2/2002 | Nye | |
| D456,155 | S | 4/2002 | DeVriendt | |
| 6,363,866 | B1 | 4/2002 | Schwartz | |
| D478,732 | S | 8/2003 | Pajerski | |
| D514,830 | S | 2/2006 | Bue | |
| D527,209 | S | 8/2006 | Nicoletti | |
| 7,171,911 | B1 | 2/2007 | Rivera, Jr. | |
| D546,097 | S | 7/2007 | Glass | |
| D559,580 | S | 1/2008 | Newhouse | |
| D571,566 | S | 6/2008 | Patel | |
| D572,505 | S | 7/2008 | Davis | |
| D573,360 | S | 7/2008 | Bue | |
| D604,522 | S | 11/2009 | Wegman | |
| 7,611,193 | B2 | 11/2009 | Bue | |
| D637,826 | S | 5/2011 | DeVriendt | |
| D639,572 | S | 6/2011 | Frobose | |
| D659,327 | S | 5/2012 | Davis | |
| 8,181,583 | B2 | 5/2012 | Rivera, Jr. et al. | A47B 3/14 108/168 |
| 8,205,937 | B2 | 6/2012 | Rivera, Jr. et al. | A47B 3/14 297/158.4 |
| D670,089 | S | 11/2012 | Frobose | |
| 8,479,667 | B2 | 7/2013 | Rivera, Jr. et al. | |
| 9,101,218 | B2 | 8/2015 | Bradley | |
| D752,316 | S | 3/2016 | Gil | |
| D781,629 | S | 3/2017 | Handler | |
| D793,136 | S | 8/2017 | Grano | |
| D802,945 | S | 11/2017 | Rivera, Jr. | |
| D832,604 | S * | 11/2018 | Samikkannu | D6/337 |
| D836,928 | S * | 1/2019 | Samikkannu | D6/337 |
| 10,238,205 | B2 * | 3/2019 | Dickey | A47B 3/083 |
| D846,925 | S | 4/2019 | Handler | |
| 2002/0161984 | A1 | 10/2002 | Lloyd-Jones | |
| 2005/0161984 | A1 | 7/2005 | Bue | |
| 2010/0301641 | A1 * | 12/2010 | Rivera, Jr. | A47B 3/14 297/158.4 |
| 2012/0013152 | A1 | 1/2012 | Bradley | |
| 2017/0245632 | A1 | 8/2017 | Dickey | |

* cited by examiner

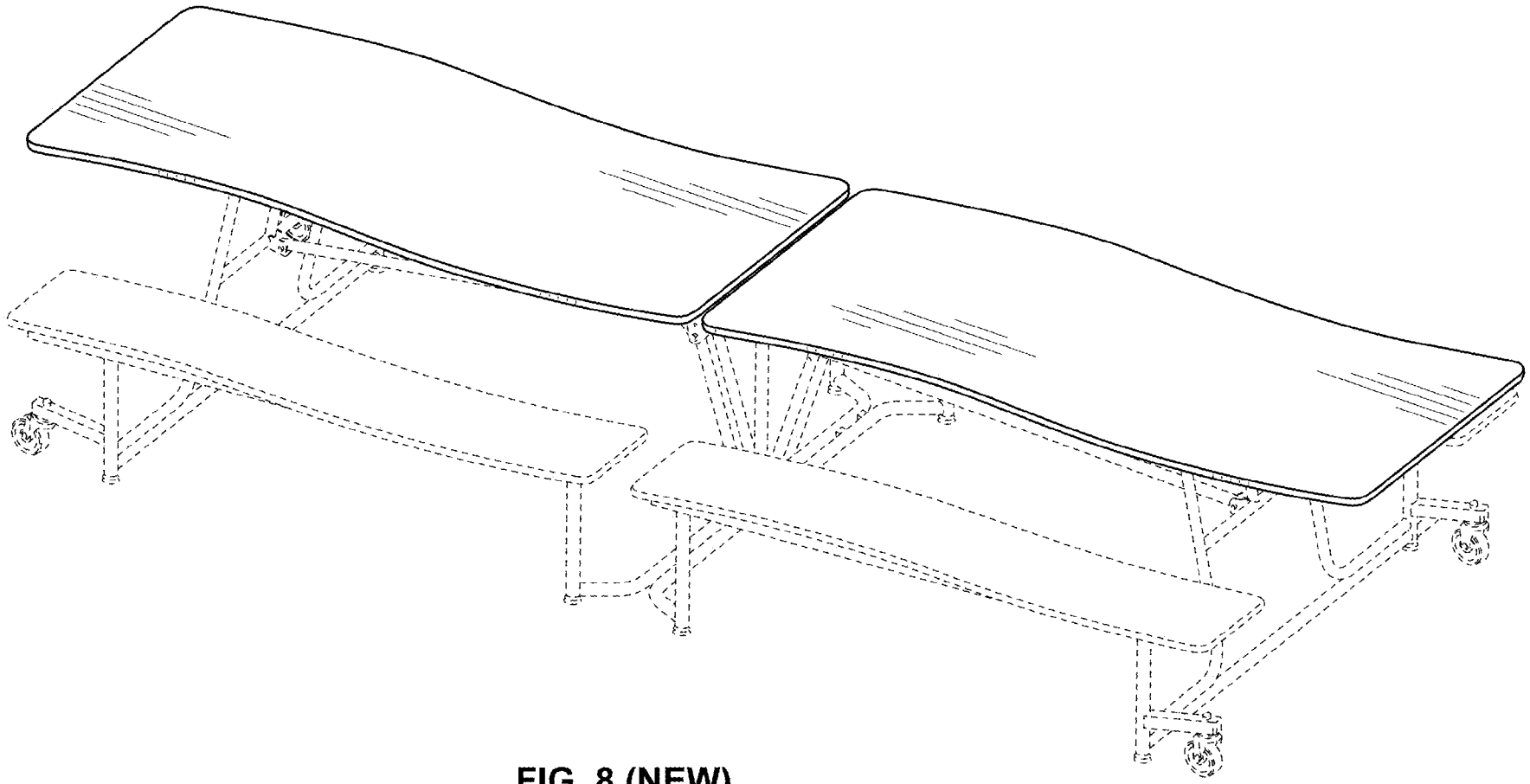
FIG. 8 (NEW)

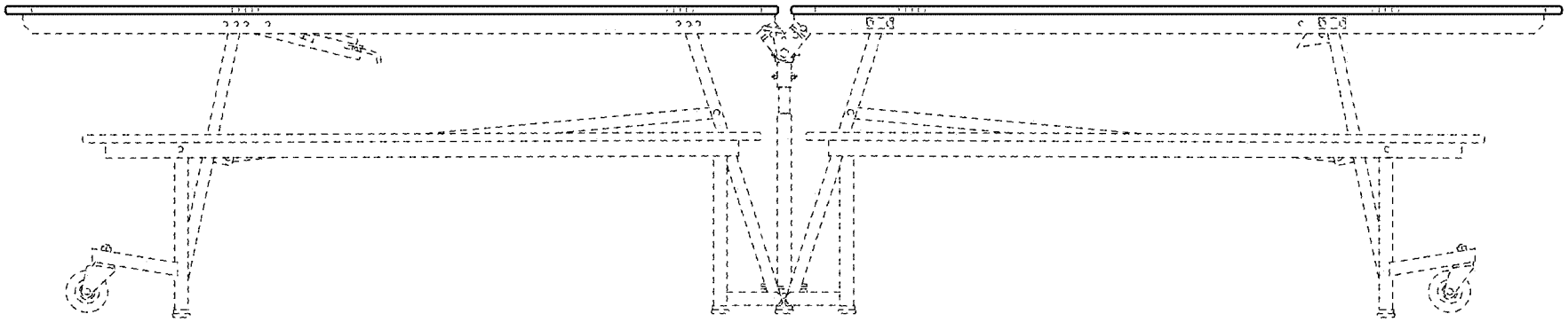
FIG. 9 (NEW)
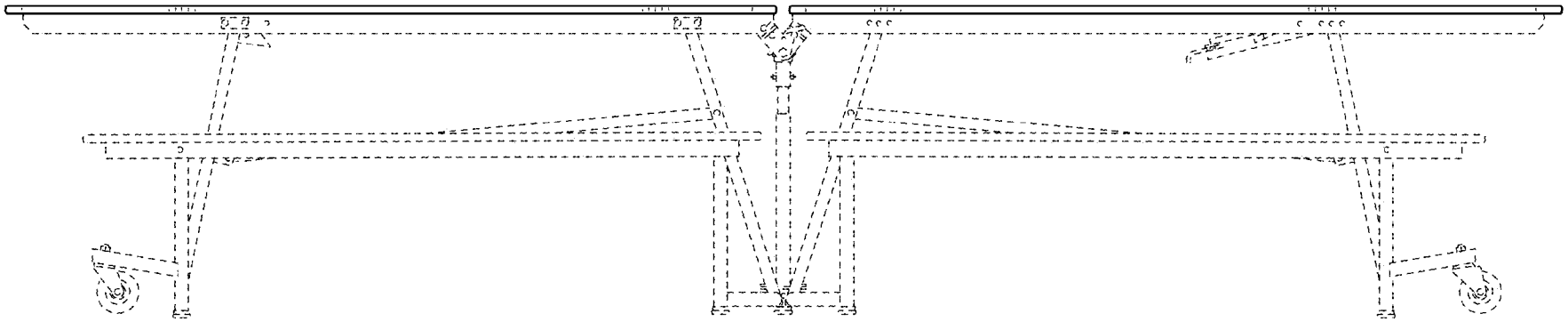
FIG. 10 (NEW)

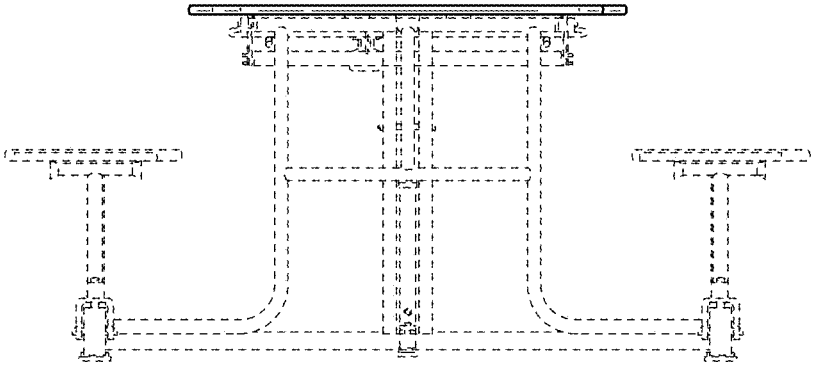
FIG. 11 (NEW)
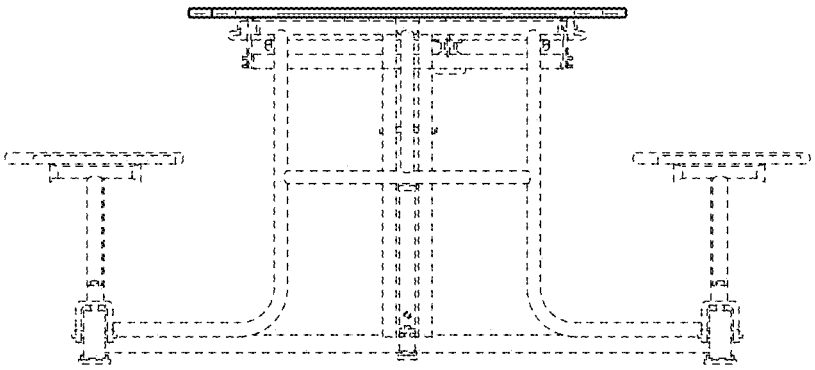
FIG. 12 (NEW)

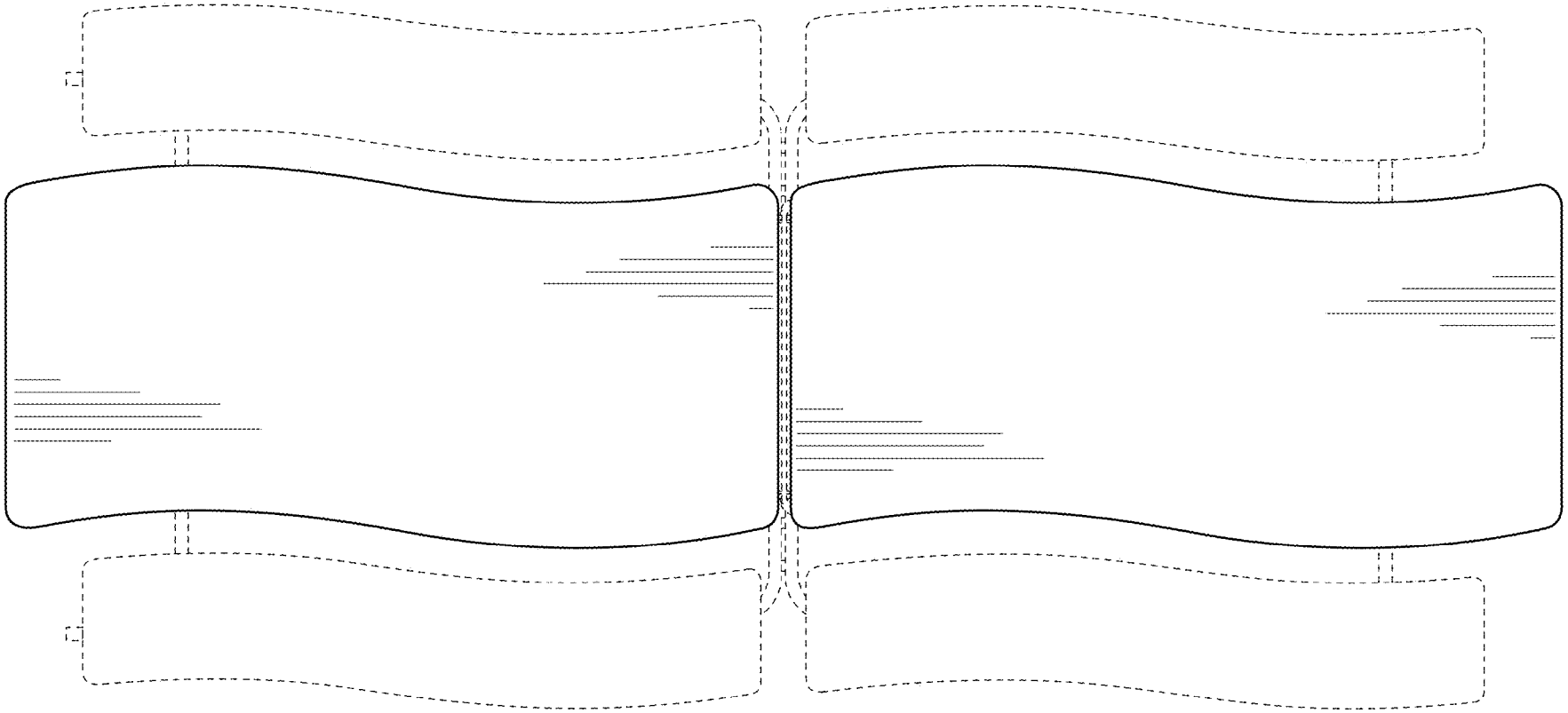
FIG. 13 (NEW)

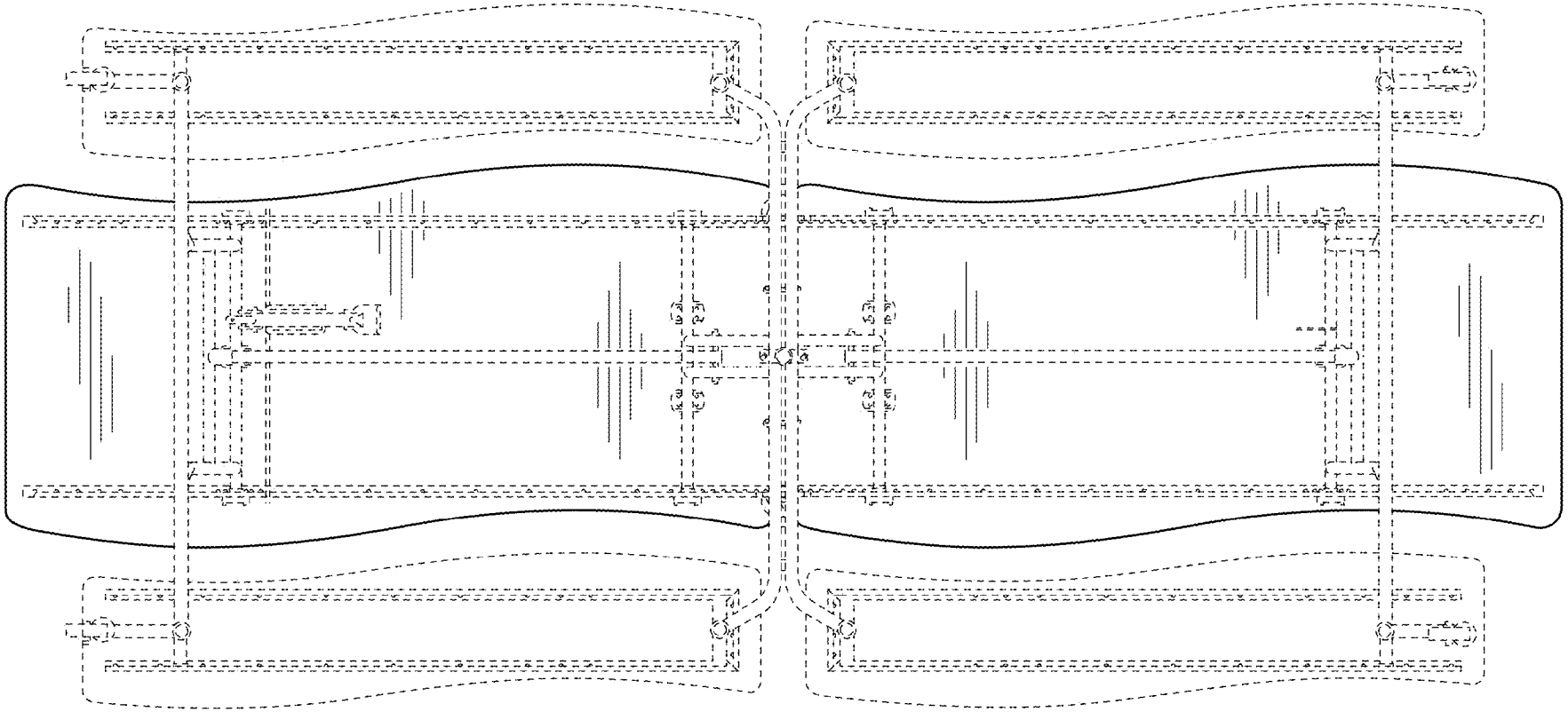
FIG. 14 (NEW)